(12) United States Patent
Haneishi et al.

(10) Patent No.: US 6,736,246 B2
(45) Date of Patent: May 18, 2004

(54) DYNAMIC DAMPER AND PROPELLER SHAFT

(75) Inventors: Kazunobu Haneishi, Tochigi (JP); Katsuhide Sasaki, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/238,188

(22) Filed: Sep. 10, 2002

(65) Prior Publication Data

US 2003/0159898 A1 Aug. 28, 2003

(30) Foreign Application Priority Data

Feb. 22, 2002 (JP) ........................................ 2002-047013

(51) Int. Cl.$^7$ ................................................. F16F 7/10
(52) U.S. Cl. ........................................ 188/379; 464/180
(58) Field of Search ................................. 464/180, 183, 464/181, 182; 188/378, 379; 74/574; 267/140.12, 140.13, 140.3, 140.4

(56) References Cited

U.S. PATENT DOCUMENTS

| | | | | | |
|---|---|---|---|---|---|
| 2,001,165 A | * | 5/1935 | Swennes | ...................... | 464/180 |
| 2,028,930 A | * | 1/1936 | Taylor | .......................... | 174/42 |
| 3,075,406 A | * | 1/1963 | Butler et al. | ................... | 74/574 |
| 4,207,957 A | * | 6/1980 | Sivers et al. | .................. | 180/380 |
| 4,223,565 A | * | 9/1980 | Sugiyama et al. | ............. | 74/574 |
| 4,667,530 A | * | 5/1987 | Mettler et al. | ................. | 74/493 |
| 4,943,263 A | * | 7/1990 | Zyogahara et al. | .......... | 464/180 |
| 5,135,204 A | * | 8/1992 | Funahashi | ................. | 267/141.4 |
| 5,138,902 A | * | 8/1992 | Muller et al. | .................. | 74/574 |
| 5,188,002 A | * | 2/1993 | Wolf et al. | ..................... | 74/574 |
| 5,326,324 A | * | 7/1994 | Hamada | ...................... | 464/180 |
| 5,328,408 A | * | 7/1994 | Wolf et al. | ................... | 464/180 |
| 5,503,043 A | * | 4/1996 | Olbrich | ........................ | 74/574 |
| 5,660,256 A | * | 8/1997 | Gallmeyer et al. | ......... | 188/379 |
| 5,996,959 A | * | 12/1999 | Gassen et al. | .............. | 248/635 |
| 6,308,810 B1 | * | 10/2001 | Kuwayama | ................. | 188/379 |
| 6,536,566 B2 | * | 3/2003 | Hasegawa et al. | .......... | 188/378 |
| 6,547,053 B2 | * | 4/2003 | Shih | ........................ | 192/55.61 |
| 6,560,837 B1 | * | 5/2003 | Hodjat et al. | ................. | 29/280 |

OTHER PUBLICATIONS

Japanese Utility Model Application Publication No. HEI 7–29324.

* cited by examiner

*Primary Examiner*—Jack Lavinder
*Assistant Examiner*—Benjamin A Pezzlo
(74) *Attorney, Agent, or Firm*—Orum & Roth

(57) ABSTRACT

This invention provides a dynamic damper 10, in which convex portions 21 protruded in the direction of the inside diameter are provided at a plurality of positions along the circumference of the outer pipe 20 and an elastic body 40 is held between the convex portion 21 and the outer circumference of the weight 30. A stopper portion 32 capable of engaging the convex portion 21 of the outer pipe 20 in the axial direction of the pipe is provided on the weight 30. An insertion guide face 23 provided at an end portion in the axial direction of the convex portion 21 of the outer pipe 20, and the convex portion 21 of the outer pipe 20 makes the insertion guide face 23 slide against the stopper portion 32 of the weight 30 to enlarge the diameter of the convex portion elastically to surpass the stopper portion 32 so that it fits to the outer circumference of the weight 30.

18 Claims, 2 Drawing Sheets

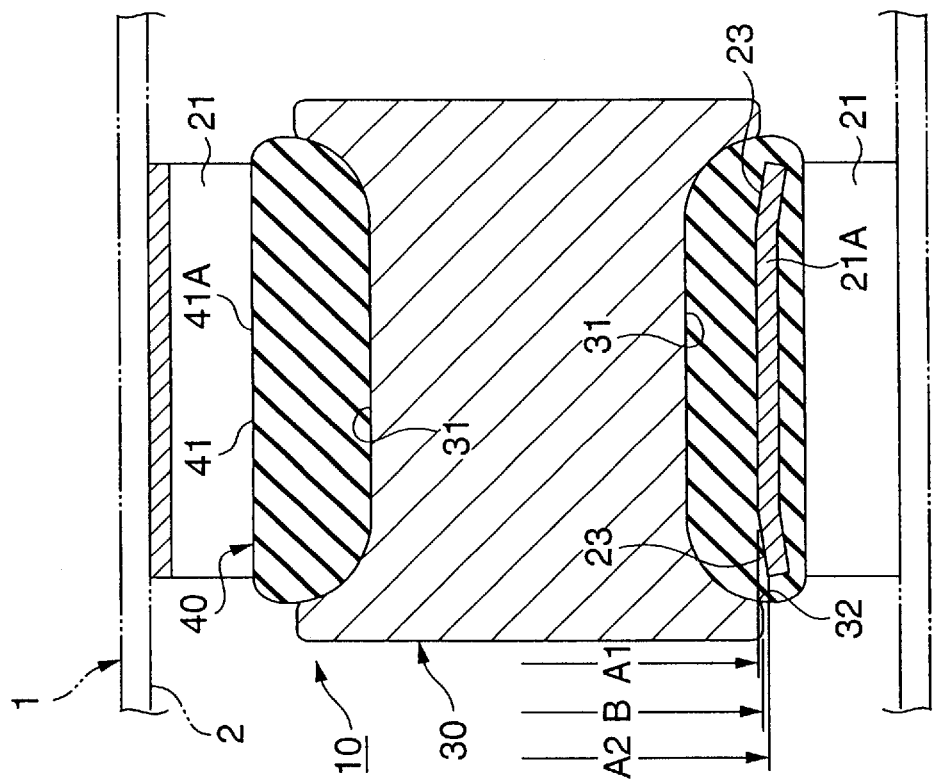
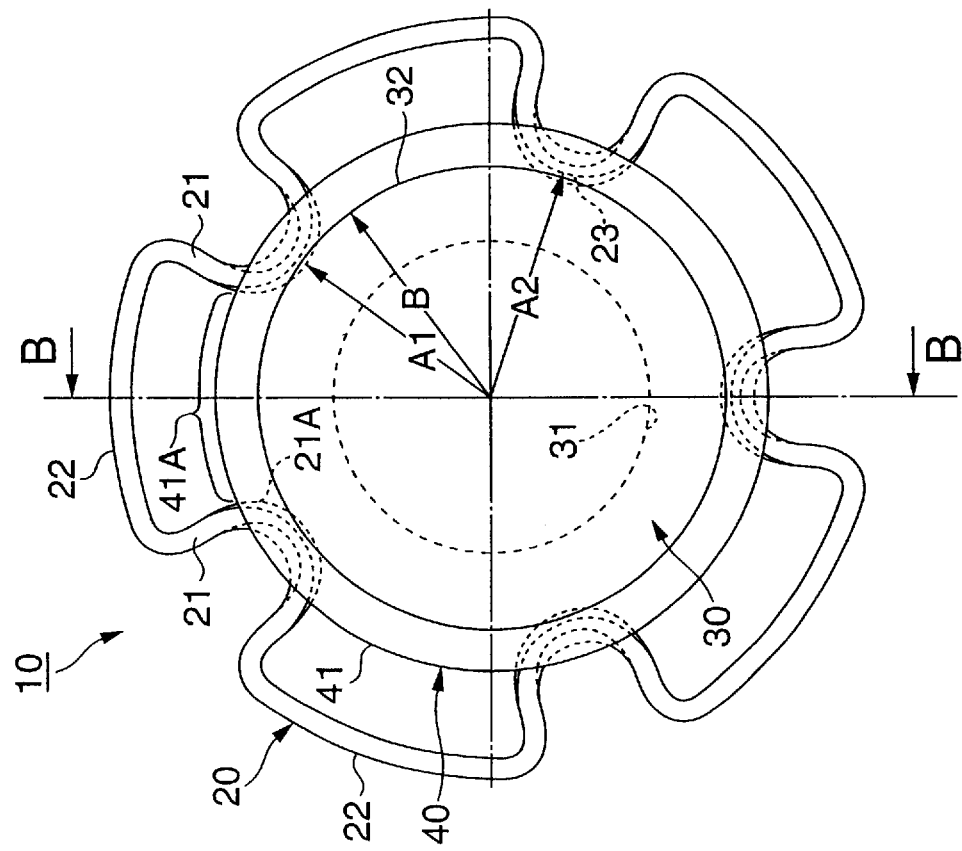

DYNAMIC DAMPER AND PROPELLER SHAFT

BACKGROUND OF THE INVENTION

1. Field of the Invention

The present invention relates to a dynamic damper and a propeller shaft.

2. Description of the Related Art

There are dynamic dampers, which reduce vibration of an automobile driving power-transmitting member, such as a propeller shaft, in order to reduce vehicle vibration and mechanical noise. Such dynamic dampers include an outer pipe, a weight disposed inside the outer pipe and an elastic body disposed between the outer pipe and the weight. This dynamic damper is pressed into a hollow shaft constituting the propeller shaft and is fixed thereto.

In the dynamic damper disclosed in Japanese Utility Model Application Publication No. H7-29324, an elastic body is disposed in an annular space between an outer pipe and a weight, and a rod-like elastic interposed portion is provided so as to extend in the radius direction at each of a plurality of positions (five positions) in the circumferential direction of the annular space.

Conventional technology has the following problems.

(1) The elastic body is so supported that an end of each elastic interposed portion is abutted to an inner face of the outer pipe while the other end portion thereof is abutted to an outer face of the weight. For this reason, there is a concern that the elastic body may receive repeated compression in the radius direction and shearing stress in the rotation direction resulting from vibration generated when the propeller shaft is revolved, so that it may become damaged with cracks. If the weight deflects largely laterally relative to the outer pipe, or drops due to cracks in the elastic body, the dynamic damper loses its initial vibration resistant characteristic.

(2) As above-described in (1), there is a concern that the elastic body may receive repeated compression in the radius direction and shearing stress in the rotation direction based on vibration of the propeller shaft, so that it may become damaged with cracks. Thus, the dynamic damper may lose its durability.

(3) The dynamic damper must be pressed into and fixed to a hollow shaft firmly so as not to be deflected by acceleration/deceleration and vibration accompanied by rotation of the propeller shaft. In case of a type in which the entire circumference of the outer pipe is pressed into the hollow shaft directly, both the members cannot be fitted to each other easily due to the existence of dimensional error between the inside diameter of the hollow shaft and the outside diameter of the outer pipe. Thus, a high dimensional accuracy is needed. Further, because the outer pipe is pressed into the hollow shaft with the entire circumference sliding on the inner face of the same hollow shaft, a contact area of the outer pipe relative to the inner face of the hollow shaft is increased. Therefore, a large press-in operation force is required, which leads to an increase of cost for production equipment.

SUMMARY OF THE INVENTION

An object of the present invention is to provide a dynamic damper, which allows a weight to be securely accommodated in an outer pipe.

An object of the present invention is to provide a dynamic damper having improved durability and reliability.

Another object of the present invention is to press a dynamic damper into a hollow shaft easily, to be fixed thereto stably.

According to the present invention, there is disclosed a dynamic damper comprising an outer pipe, a weight disposed inside the outer pipe and an elastic body interposed between the outer pipe and the weight.

Convex portions protruded in the direction of the inside diameter are provided at a plurality of positions along the circumference of the outer pipe, and an elastic body is held between the convex portion and the outer circumference of the weight.

A stopper portion, which is capable of engaging the convex portion of the outer pipe in the axial direction of the outer pipe by relative moving of the outer pipe and the weight, is provided on the weight.

An insertion guide face provided at an end portion in the axial direction of the convex portion of the outer pipe, and the convex portion of the outer pipe, makes the insertion guide face slide against the stopper portion of the weight. This enlarges the diameter of the convex portion elastically to surpass the stopper portion so that it fits to the outer circumference of the weight.

BRIEF DESCRIPTION OF THE DRAWINGS

The present invention will be more fully understood from the detailed description given below and from the accompanying drawings which should not be taken to be a limitation on the invention, but are for explanation and understanding only. The drawings:

FIGS. 1A and 1B show a dynamic damper, where FIG. 1A is a front view thereof and FIG. 1B is a sectional view taken along the line B—B.

DESCRIPTION OF THE PREFERRED EMBODIMENTS

Figure 2:
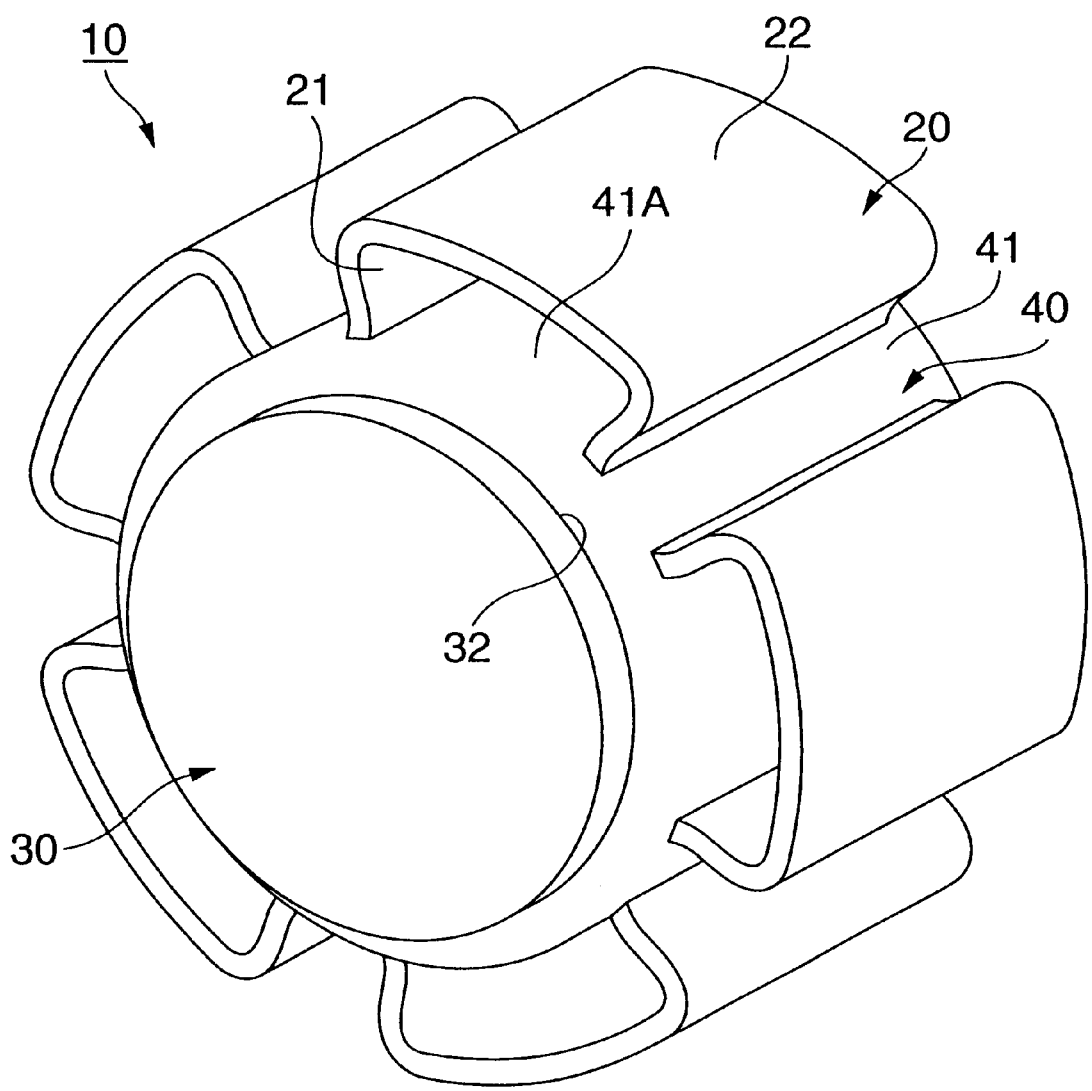
FIG. 2 is a perspective view showing a dynamic damper.

Reference numeral 10 in FIGS. 1A and 1B denotes a dynamic damper 10, which is pressed into a hollow shaft 2 of an automobile propeller shaft 1 and disposed at a predetermined position thereof in the axial direction. The dynamic damper 10 reduces vibration of the propeller shaft 1 so as to reduce vehicle body vibration and mechanical noise.

The dynamic damper 10 comprises an outer pipe 20, a weight 30 and an elastic body 40.

The outer pipe 20 is formed by bending a metallic pipe such as thin steel pipe, in the form of an irregularly shaped cylinder. This outer pipe 20 contains convex portions 21 protruded in the direction of its inside diameter at a plurality of positions (5 positions in this specification) along the circumferential direction. More specifically, in the outer pipe 20, the convex portions 21 are formed by bending the plural portions along the circumferential direction of a round pipe in the direction of the inside direction with a press while remaining portions are kept as circular portions 22 (circular portion 22 having substantially the same curvature of a hollow shaft 2). An end face of the convex portion 21 of the outer pipe 20 acts as a round pressing face 21A to the outer circumferential portion of an elastic body 40. The outside diameter of the outer pipe 20 under the free state formed by the circular portions 22 is set larger than the inside diameter of the hollow shaft 2. The outside diameter can be contracted elastically from the free state due to the elastic distortion characteristic possessed by the bent portion of the convex portion 21.

The weight 30 is formed of a metallic rod such as steel rod in the form of a short cylinder, such as a circular cylinder. The weight 30 has annular grooves 31 provided in the entire circumference for loading the elastic body 40. The weight 30 is disposed inside the outer pipe 20 coaxially with the outer pipe 20. The weight 30 is wider than the outer pipe 20 (FIG. 1B).

The elastic body 40 is formed in an annular form and is loaded on the entire circumference of the annular groove 31 in the weight 30 between the outer pipe 20 and the weight 30. The outer circumference of the elastic body 40 is a circular face continuous along the entire circumference, which is larger than the outside diameter of the weight 30. The elastic body 40 is formed of synthetic rubber and bonded to the outer pipe 20 and the weight 30 by vulcanizing.

The dynamic damper 10 holds the elastic body 40 by sandwiching the elastic body 40 on the weight 30 with the end pressing faces 21A of the convex portion 21 of the outer pipe 20 from the radiation direction. Also, the dynamic damper 10 sandwiches the outer peripheral portion 41 of the elastic body 40 between the end pressing faces 21A in the circumferential direction of the convex portions 21 adjacent in the circumferential direction of the outer pipe 20. The end pressing face 21A of each convex portion 21 is buried in a predetermined depth in the outer peripheral portion 41 of the elastic body 40. The outer peripheral portion 41A is sandwiched between the end pressing faces 21A of the convex portion 21.

In the dynamic damper 10, the diameter A1 of an inscribed circle (inscribed circle in contact with portions excluding both end portions in which the insertion guide face 23 of the convex portion 21 is provided) in contact with each convex portion 21 of the outer pipe 20 is set smaller than the outside diameter B of each of right/left stopper portions 32 located on both edge portions of an annular groove 31 in the outer circumference of the weight 30. The stopper portions 32 provided on the weight 30 are capable of engaging with the convex portion 21 on the outer pipe 20 in the axial direction if the outer pipe 20 and the weight 30 move relative to each other.

Further, in the dynamic damper 10, the diameter of the inscribed circle in contact with each of both end portions along the axial direction of the convex portion 21 of the outer pipe 20 is increased up to A2 (A2>B) gradually so as to provide an insertion guide face 23 for the weight 30. The convex portion 21 of the outer pipe 20 makes the insertion guide face 23 provided at the convex portion 21 of the outer pipe 20 slide against the stopper portion 32 of the weight 30. This enlarges the diameter of the convex portion 21 elastically to surpass the stopper portion 32 so that it fits to the annular groove 31 in the outer circumference of the weight 30.

To produce the dynamic damper 10, the elastic body 40 is formed integrally by injection molding by pouring rubber in a mold in which the outer pipe 20 and the weight 30 are disposed. Alternatively, the elastic body 40 may be formed separately and subsequently bonded to the outer pipe 20 and/or the weight 30.

This embodiment has the following operations.

(1) The weight 30 is provided with the stopper portion 32 which is capable of engaging the convex portion 21 of the outer pipe 20 in the axial direction. Therefore, if the elastic body 40 happens to be damaged with cracks so that the weight 30 tends to move laterally relative to the outer pipe 20, the stopper portion 32 of the weight 30 engages the convex portion 21 of the outer pipe 20 so as to prevent the weight 30 from moving largely laterally, or from dropping. The weight 30 is accommodated inside the outer pipe 20 securely, so that the initial vibration resistance of the dynamic damper 10 is secured.

(2) When assembling the outer pipe 20 with the weight 30, the convex portion 21 of the outer pipe 20 makes the insertion guide face 23 provided at the convex portion 21 of the outer pipe 20 slide against the stopper portion 32 of the weight 30 to enlarge the diameter of the convex portion 21 elastically to surpass the stopper portion 32 so that it fits to the annular groove 31 in the outer circumference of the weight 30. After that, the elastic body 40 is formed by pouring rubber between the outer pipe 20 and the weight 30. Thus, production and assembly of the dynamic damper 10 can be facilitated.

(3) The dynamic damper 10 is provided with the annular elastic body 40 mounted in the entire annular space between the outer pipe 20 and the weight 30. Further, the outer circumferential portion 41A of the elastic body 40 is sandwiched and held between the convex portion 21 protruded in the direction of the inside diameter of the outer pipe 20 and adjacent the convex portion 21 in the circumferential direction. Consequently, upon repeated application of load due to compression in the radius direction from the weight 30, shearing stress in the rotation direction and the like based on rotary vibration of the propeller shaft 1 is distributed widely to respective portions of the elastic body 40. Thus, concentration of stress on the elastic body 40 is suppressed so as to prevent cracking damage, thereby improving the durability of the dynamic damper 10.

(4) Because the convex portions 21 are formed by bending respective portions of the outer pipe 20 in the circumferential direction in the direction of the inside diameter, elastic distortion characteristics in the radius direction can be obtained at the bent portions of the convex portions 21. Therefore, when the dynamic damper 10 is pressed into the hollow shaft 2, dimensional error between the inside diameter of the hollow shaft 2 and the outside diameter of the outer pipe 20 is absorbed by elastic distortion of the outer pipe 20 and elastic distortion of the elastic body 40, thereby allowing the dynamic damper to be pressed into the hollow shaft 2 easily. After being pressed in, the dynamic damper can be fixed firmly to an inner face of the hollow shaft 2 due to elastic restoration forces of the outer pipe 20 and the elastic body 40.

(5) When the outer pipe 20 is pressed into the hollow shaft 2, only the plural circular portions 22, except the bent portions of the convex portions 21 on the entire circumference of the outer pipe 20, rub the hollow shaft 2. As a result, the contact area of the outer pipe 20 with the inner face of the hollow shaft 2 is decreased. The result is that the press-in operation force is also decreased which leads to reduction of cost on production equipment.

(6) The aforementioned (1) to (5) are achieved in the propeller shaft 1, so that the weight 30 can be accommodated securely inside the outer pipe 20 constituting the dynamic damper 10. Additionally, the durability of the dynamic damper 10 can be improved. Further, the dynamic damper 10 can be pressed into the hollow shaft 2 easily and fixed thereto in a stable condition.

As heretofore explained, embodiments of the present invention have been described in detail with reference to the drawings. However, the specific configurations of the present invention are not limited to the embodiments but those having a modification of the design within the range of the present invention are also included in the present invention. For example, the dynamic damper of the present invention can be applied to a driving power transmitting member other than the propeller shaft.

As described above, the dynamic damper according to the present invention allows the weight to be securely accommodated inside the outer pipe. Further, according to the present invention, the durability and reliability of the dynamic damper can be improved. Further, according to the present invention, the dynamic damper can be pressed into the hollow shaft easily and fixed thereto in a stable condition.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A dynamic damper comprising an outer pipe, having a plurality of convex portions protruded in the inside diameter at a plurality of positions along the circumference of the outer pipe, a weight disposed inside the outer pipe and an elastic body interposed between the outer pipe and the weight, the elastic body being held between the convex portions and the outer circumference of the weight, a stopper portion disposed on the weight, the stopper portion being engagable with the convex portion of the outer pipe in the axial direction of the outer pipe by relative moving of the outer pipe and the weight, and an insertion guide face provided at an end portion in the axial direction of the convex portion of the outer pipe, wherein the convex portion of the outer pipe is arranged and constructed to facilitate the insertion guide face to slide against the stopper portion of the weight to enlarge the diameter of the convex portion elastically to a diameter larger than the diameter of the stopper portion.

2. The dynamic damper according to claim 1, wherein the outer circumferential portion of the elastic body is nipped between the convex portions adjacent to each other of said outer pipe.

3. The dynamic damper according to claim 1, wherein the outer pipe is bent in the direction of the inside diameter at a plurality of positions along the circumferential direction so as to form the convex portions.

4. The dynamic damper according to claim 2, wherein the outer pipe is bent in the direction of the inside diameter at a plurality of positions along the circumferential direction so as to form the convex portions.

5. The dynamic damper according to claim 1, wherein a contact face of the convex portion with the outer peripheral portion of the elastic body is formed in the form of a round face.

6. The dynamic damper according to claim 1, wherein the weight is disposed inside the outer pipe and coaxially with the outer pipe.

7. A propeller shaft wherein the dynamic damper according to claim 1 is pressed into and fixed to a hollow shaft.

8. A propeller shaft wherein the dynamic damper according to claim 2 is pressed into and fixed to a hollow shaft.

9. A propeller shaft wherein the dynamic damper according to claim 3 is pressed into and fixed to a hollow shaft.

10. A propeller shaft wherein the dynamic damper according to claim 4 is pressed into and fixed to a hollow shaft.

11. A propeller shaft wherein the dynamic damper according to claim 5 is pressed into and fixed to a hollow shaft.

12. A propeller shaft wherein the dynamic damper according to claim 6 is pressed into and fixed to a hollow shaft.

13. The dynamic damper according to claim 1 wherein the weight is a single weight.

14. The dynamic damper according to claim 2 wherein the weight is a single weight.

15. The dynamic damper according to claim 3 wherein the weight is a single weight.

16. The dynamic damper according to claim 4 wherein the weight is a single weight.

17. The dynamic damper according to claim 5 wherein the weight is a single weight.

18. The dynamic damper according to claim 6 wherein the weight is a single weight.

* * * * *